United States Patent
Odendaal et al.

(10) Patent No.: US 6,960,968 B2
(45) Date of Patent: Nov. 1, 2005

(54) PLANAR RESONATOR FOR WIRELESS POWER TRANSFER

(75) Inventors: Willem G. Odendaal, Blacksburg, VA (US); Yusban Li, Longmont, CO (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 25 days.

(21) Appl. No.: 10/180,403

(22) Filed: Jun. 26, 2002

(65) Prior Publication Data

US 2004/0000974 A1 Jan. 1, 2004

(51) Int. Cl.[7] .............................. H01P 7/00; H02J 7/00
(52) U.S. Cl. ...................................... 333/219; 320/110
(58) Field of Search .............................. 333/219, 177; 235/492; 320/108, 109, 110; 330/301; 336/69, 83; 360/123; 363/37, 61; 367/142; 505/210

(56) References Cited

U.S. PATENT DOCUMENTS

| | | | | |
|---|---|---|---|---|
| 3,660,790 A | * | 5/1972 | Palazzetti | 336/69 |
| 4,409,632 A | * | 10/1983 | Kanai et al. | 360/123 |
| 4,894,629 A | * | 1/1990 | Okamura et al. | 333/177 |
| 4,981,838 A | * | 1/1991 | Whitehead | 505/210 |
| 5,353,001 A | * | 10/1994 | Meinel et al. | 336/83 |
| 5,710,502 A | * | 1/1998 | Poumey | 320/108 |
| 5,714,864 A | * | 2/1998 | Rose et al. | 320/109 |
| 5,847,947 A | * | 12/1998 | Pan et al. | 363/61 |
| 6,008,622 A | * | 12/1999 | Nakawatase | 320/108 |
| 6,075,427 A | * | 6/2000 | Tai et al. | 333/219 |
| 6,124,699 A | * | 9/2000 | Suzuki et al. | 320/110 |
| 6,173,899 B1 | * | 1/2001 | Rozin | 235/492 |
| 6,259,325 B1 | * | 7/2001 | Ishizuka et al. | 330/301 |
| 6,515,878 B1 | * | 2/2003 | Meins et al. | 363/37 |
| 6,570,819 B1 | * | 5/2003 | Clark et al. | 367/142 |
| 6,844,702 B2 | * | 1/2005 | Giannopoulos et al. | 320/108 |

FOREIGN PATENT DOCUMENTS

| | | | |
|---|---|---|---|
| EP | 715392 | * | 6/1996 |
| EP | 932255 | * | 7/1999 |
| GB | 2252208 | * | 7/1992 |
| GB | 2314470 | * | 12/1997 |

* cited by examiner

*Primary Examiner*—Patrick Wamsley (57) ABSTRACT

A planar resonator and method of manufacture provides contactless power transfer using at least two electrically isolated axis aligned conductive across the transfer interface in a coupled inductor or transformer configuration. Signal or power transfer is then accomplished by coupling of magnetic flux. The coupling of electric flux is also accomplished across a same interface and driven with the same conductive spiral-wound conductors. An interface of energy transfer (IOET) has a first spiral-shaped conductor arranged on the top surface of said IOET; a second spiral-shaped conductor arranged on the bottom surface of said IOET, has a vertical axis aligned with the first spiral-shaped conductor. The IOET and the first and second spiral-shaped conductors have a predetermined self-resonant frequency. The planar power resonator stores electric energy in the IOET, and at predetermined frequencies, the arrangement of the first and second spiral-shaped conductors and the IOET permits transfers of magnetic flux and electrical energy between the first and second spirals across the IOET. The resonator facilitates contactless battery charging in devices such as cellphones and wearable electronics where the resonator can be woven into fabric or attached to a person's clothes.

25 Claims, 7 Drawing Sheets

APPLICATIONS

PARALLEL-LOADED RESONANT
HALF BRIDGE

LOW-PASS FILTER

SERIES

PARALLEL

PLANAR RESONATOR FOR WIRELESS POWER TRANSFER

FIELD OF THE INVENTION

The present invention is related to contactless power transfer systems. More particularly, the present invention is related to a planar resonator for wireless power transfer in a contactless power transfer system.

BACKGROUND AND SUMMARY OF THE INVENTION

Contactless power transfer has been used in applications such as the non-intrusive charging of pacemaker batteries, the charging of hybrid vehicle batteries, etc. In such applications, inductive coupling is used exclusively so that a current is induced from a power station to a load. In such systems, the power transfer is exclusively accomplished by means of coupling magnetic flux of the power station and the load.

For example, road systems that would encourage the use of electric vehicles have been studied by states such as California. In such a system, inductively coupled flat coils are embedded in the roadway, or cables that are embedded in the roadway are energized, so that an induction coil of the vehicle receives induced current from the roadway coils to permit battery charging and/or even propulsion. Typically such a system requires that the flux collection surface of the buried coil and the vehicle maintain a distance within five centimeters of each other to provide sufficient power transfer by induction.

U.S. Pat. No. 5,608,771 to Steigerwald et al. discloses a contactless power transfer system, wherein power is transferred from a stationary supply to a rotational load via the use of a rotary transformer. This system eliminates the brush and slip ring arrangements. The coupling in this type of system is also inductive.

Another arrangement is the use of a clamp-on link around a primary conductor that does not physically contact the conductor. The transfer of power is still via induction.

In a separate field, that of security identification, there are identification tags for persons and vehicles (such as the EZ-Pass, Smart-Tag and Fast Lane automatic toll collection systems on parts of Interstate 95 and certain bridges in tunnels from Boston to Virginia) that do not provide power transfer, but are used in a form of wireless communication. The security tags and toll collection tags include both inductive-coupled and capacitive-coupled transponders. The prior art lacks a system for contactless power transfer that includes capacitive-coupled functionality of electric flux, in addition to the inductive coupling of magnetic flux.

It would be advantageous to provide a planar resonator for wireless power transfer that allows power transfer over a non-magnetic, non-conductive, galvanically-isolated volume (material). The resonant component exhibits the characteristics of an integrated inductor-capacitor-transformer.

In a first aspect of the invention, a planar resonator includes a coil arranged in a single spiral configuration. However, when used in a multiple spiral configuration, the capacitance between the spirals can be used for energy transfer, resulting in a combination of electric and magnetic energy transference across an IOET. In another aspect, the spirals can be arranged on opposite sides of each other. The connection a can be wireless, for example, so that a battery of a cellphone could be charged without physical wires connecting the cellphone to a charger.

Depending on the physical arrangement and/or the materials used, the planar resonator stores both electric and magnetic energy for the purpose or impedance matching or accomplishing soft-switching in an attached switching power electronic converter circuit, in addition to transferring power across the interface-of-energy-transfer (hereafter "IOET") in either an electric or magnetic form, or both. The physical arrangement and/or materials used can permit transformer action with or without capacitive energy transfer, in addition to inductive energy storage, electrical (capacitive) energy storage or combinations thereof, such as magnetic transformer coupling with built-in LC resonant properties. The planar resonator does not necessarily use the IOET for energy transfer, for example, in a single coil configuration.

According to another aspect of the invention, an isolating coupling interface and a resonant tank are functionally integrated into a planar configuration for transferring power with isolation properties. The device may comprise two separable structures on either side of the IOET, such as, for example, a cellphone and its charger. Since there are no electrical contacts necessary at the IOET, the size of the entire charging circuit may be reduced while still complying with isolation specifications for safety standards such as IEC950. The physical structure may include a set of spiral coils on each side of the IOET, typically with each spiral being a conductor trace on a separate substrate, such as flex or printed circuit board (FR-4).

An advantage of the present invention is that it facilitates the use of wearable electronics. For example, flex circuits may be used so as to cause the surface of the coils to be flexible. In addition to the flexibility, the coils may be formed in any arbitrary shape to facilitate woven wire arranged in a fabric, or pads with embedded conductors that can be attached to clothes. In this way, for example, one could charge a radio, cellphone, and/or computer (just to name a few of the many wearable items) by bringing the device in close proximity to the fabric. Thus, implementation of the invention with wearable electronics could provide an interface between the wearable device(s) and external power sources. Digital or analog signals may also be transmitted across such interfaces to, for instance, up- or download digital information.

In another aspect of the invention, the IOET of the planar power resonator may have a thin and/or relatively flat top coil surface. In a wireless application, the IOET may be comprised of, for instance, (i) a non-conductive/dielectric film (for isolation) on the bottom of the top spiral(s), (ii) air; and (iii) a non-conductive/dielectric film (for isolation) on the top of the bottom spiral(s). The coils may be arranged in an upper and lower configuration substantially axially aligned. In addition, there can be an emulsifier at the bottom portion of an upper coil, with an air gap between the emulsifier and the top portion of the lower coil.

The spiral-shaped conductor may comprise pcb spiral-wound conductors. In addition, a battery charging circuit can be coupled to one of the first and second spiral-shaped conductors, and a load can be coupled to the other of the first and second spiral-shaped conductors. The coupling between battery charging circuit and the battery may comprise capacitive coupling and/or magnetic coupling, and wherein power is transferred by the coupling of an electric field and/or magnetic flux across the IOET.

According to an aspect of the present invention, a signal applied to the first spiral-shaped conductor can be transferred to the second spiral-shaped conductor by coupling of magnetic flux of the first and second spiral-shaped conductors across the IOET.

The first and second spiral-shaped conductors and the IOET are preferably integrated into a planar (flat/thin) structure.

The planar resonator may further comprise a third spiral-shaped conductor arranged in a bi-filar spiral configuration with the first spiral-shaped conductor on the top surface of the IOET, and/or a fourth spiral-shaped conductor arranged in a bi-filar spiral configuration with the second spiral-shaped conductor on the bottom surface of the IOET. It should be understood that a bi-filar top and single bottom, or single top and bi-filar bottom are alternative arrangements. Equivalent series or parallel resonator operation can be accomplished by the absence or presence, respectively, of galvanic connections between these two spirals.

The bi-filar spiral configuration on the top surface and bottom surface of the IOET can be therefore be arranged to form a parallel resonator, or a series resonator.

In addition, instead of a bi-filar configuration, a plurality of spiral-shaped conductors can be arranged in a multi-filar configuration on the respective top or bottom surface. The spiral-shaped conductors can be configured so the planar resonator comprises a parallel resonator, or a series resonator.

The first plurality and second plurality of spiral-shaped conductors may be configured so the planar resonator comprises a parallel resonator, or a series resonator. There can be an arrangement wherein each coil forms a capacitor plate. In this arrangement the planar resonator acts as an inductor and capacitor series.

A bi-filar arrangement can also be obtained by a second film of dielectric material that separates the two spirals that form the bi-filar arrangement on one side of the IOET. (I.e. the dielectric film is on top of top spiral; another spiral rests on top of this dielectric film. This dielectric film stores electric energy and forms the capacitive part of the resonator, where the inductive part is obtained from the self-coupling of the set of spirals either side of the dielectric film.

Instead of a bi-filar arrangement, where the spirals are wound in the same direction, one of the spirals may have an opposite winding direction. Thus, the two spirals in this case would not lie in the same physical plane. This advantage can be exploited when it is necessary or desirable to have a flexible circuit, or when it might be desirable to have several layers of coils to increase the magnetic and electric capabilities of the resonator. Each of the above arrangements exhibit transmission line properties, some with multiple resonant frequencies. Electrical behavior may further be modeled by a distributed network of equivalent electrical resistors, capacitors, inductors and coupled inductors. The values of the distributed elements and thus the electrical behavior of the structure at its terminals, including resonant frequencies, impedance, gain and phase are controllable by choice of material properties and the geometric configuration of the spirals and interfaces.

DETAILED DESCRIPTION OF THE INVENTION

The following description is provided for purposes of illustration, and not for limitation. There are many different configurations that are well within the spirit of the invention, and the scope of the appended claims.

Figure 1A:
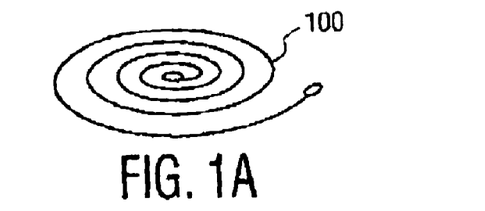
FIGS. 1A and 1B illustrate a basic spiral, and a bi-filar spiral arrangement that may be used in the present invention.
Figure 1B:
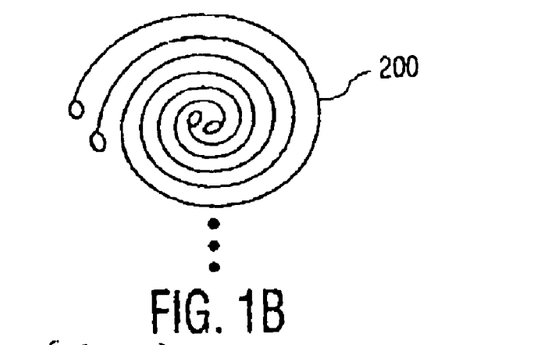

FIGS. 1A–1B illustrate variations of planar integrated resonators according to an aspect of the present invention. An integrated resonator is obtained by storing electric energy in a part of the time-energy function of a structure (geometry) that also stores magnetic energy in a part of the same function.

Figure 2A:
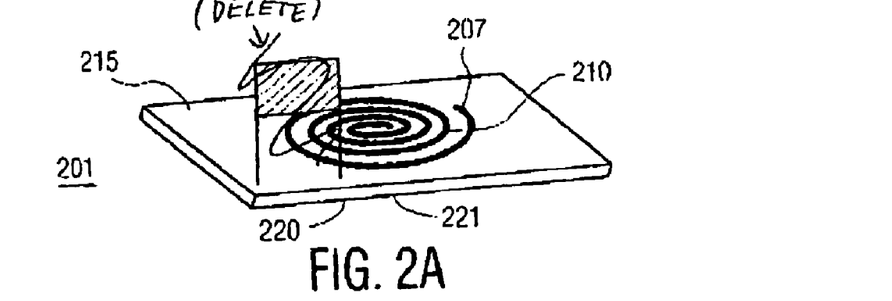
FIGS. 2A and 2B illustrate an embodiment of a planar resonator according to the present invention, and a cross sectional slice of the spirals and the IOET.

FIG. 1A illustrates an example of a basic spiral 100, whereas FIG. 1B illustrates a bi-filar spiral 200. Of course, it should be understood by persons of ordinary skill in the art that the present invention is not limited to spirals and bi-filar spirals, and may use any number of spiral wrappings (multi-filar) according to need. As shown in FIG. 2A, the planar 200 has a spiral 210 wound on a top side of the interface-of-energy-transfer (IOET) 215, and another spiral (not shown) is wound the bottom side 220 of the interface-of-energy-transfer (IOET). The axis, inner diameter and outer diameter of the spiral on the top side of the IOET correspond closely to the spiral on the bottom side of the IOET.

Figure 2B:
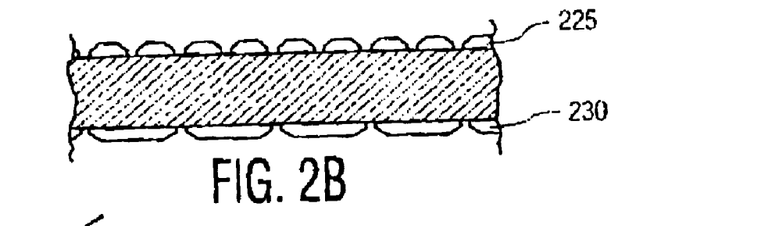

FIG. 2B illustrates a cross section of the spiral 210 shown in FIG. 2A. From this cross section, it can be seen that the spiral has conductors 225, 230 separated by the IOET Configuring a the IOET layer between spirals that own a magnetic coupling coefficient, (i.e. sharing a common flux) permits the integrated resonator to store the electric energy that is part of the time-energy function of the structure that stores the magnetic energy.

Figure 2C:
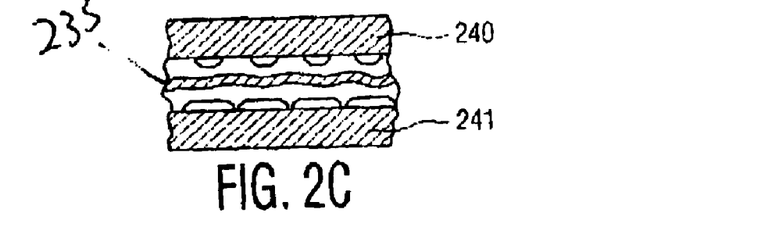
FIG. 2C illustrates an alternative arrangement wherein the dielectric and spirals are arranged within substrate material 240,241.

It should be noted that while FIG. 2B shows an IOET having spiral conductors arranged on above and below, the IOET does not have to be the substrate, and as shown in FIG. 2C, the IOET is arranged between substrate 240 and 241. The two substrate materials are either side of interface 235, along which they may be disjoined if 235 is an air gap.

The IOET may have $\mu_r > 1$, or $E_r > 1$, where: $\mu_r$ is the relative permeability of the material and $E_r$ is the relative permittivity of the material.

Figure 3:
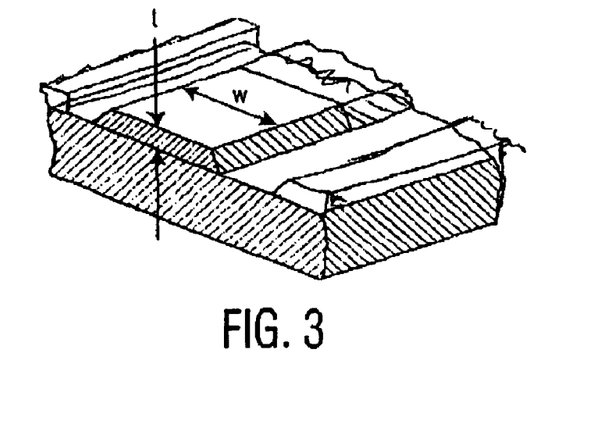
FIG. 3 is an illustration of a cross-sectional portion of a spiral wound around the IOET.

FIG. 3 shows an embodiment where multiple parallel spirals or multi-filar can be used. As shown in FIG. 3A "w" equals the width and "t" equals the thickness. The number of turns of the spirals and their dimensions, as well as connection and rotation directions may be configured to achieve series, parallel, or a series/parallel combination circuit.

Figure 4:
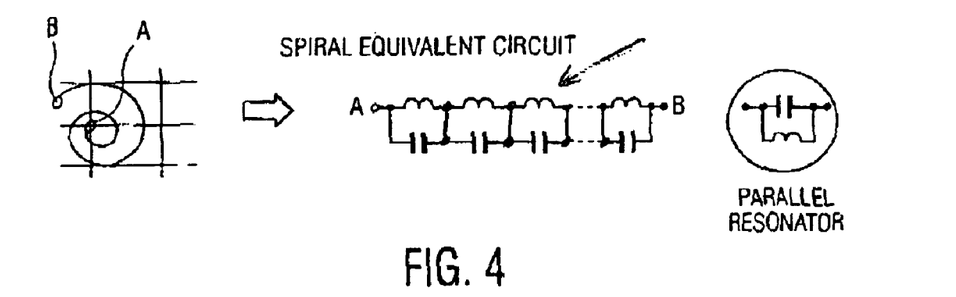
FIG. 4 illustrates the approximate equivalent circuit for the spiral arrangement shown in FIG. 1A.
Figure 5:
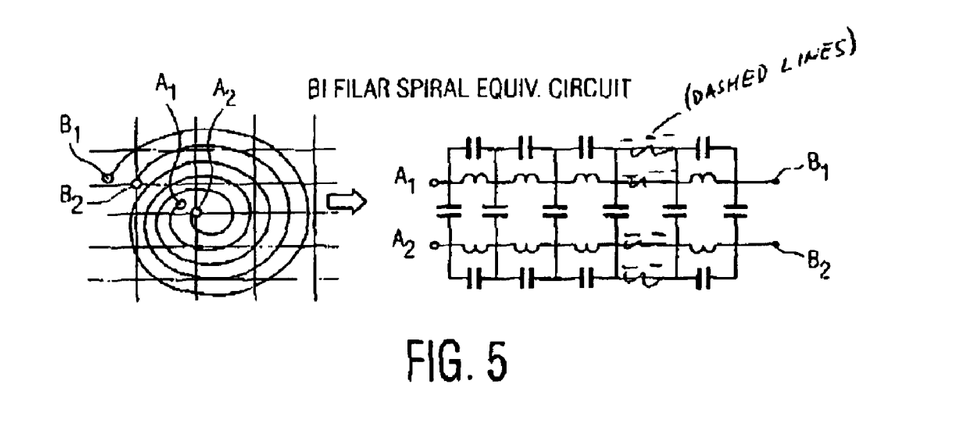
FIG. 5 illustrates an approximate equivalent circuit for the spiral arrangement shown in FIG. 1B.

FIGS. 4, 5, 6, and 7 illustrate arrangements of the spirals using notation such as A and B to distinguish between individual spirals, and their equivalent circuits. For example, FIG. 4 is the approximate equivalent circuit for FIG. 1A, which may be further reduced as a first approximation into an equivalent lumped capacitor and equivalent lumped inductor.

It should be noted that, for example, a more complex equivalent circuit model may include a transformer, and the complexity of such a model may be extended to include higher order effects by considering it as a transmission line network.

Figure 6:
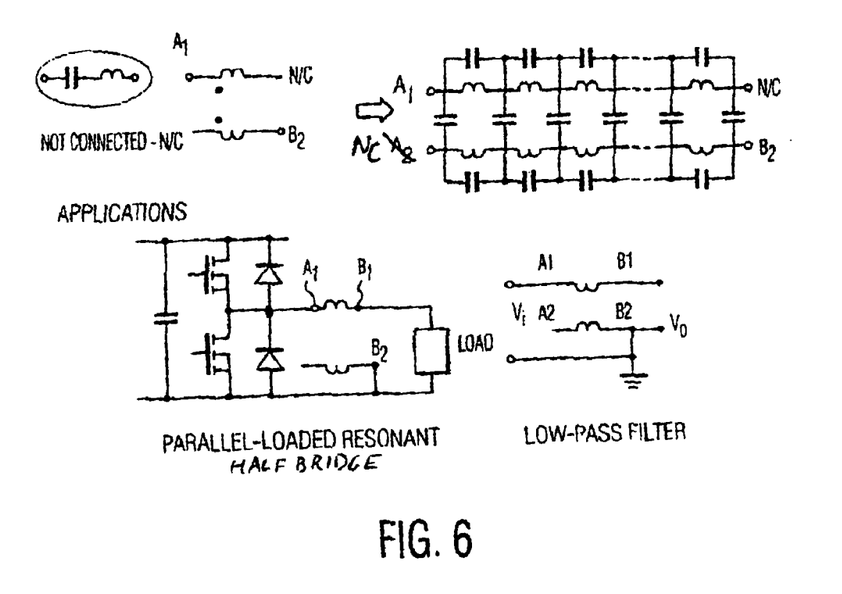
FIGS. 6 and 7 illustrate schematic arrangements of the spirals configured so that the present invention functions as a series resonator and a parallel resonator.
Figure 7:
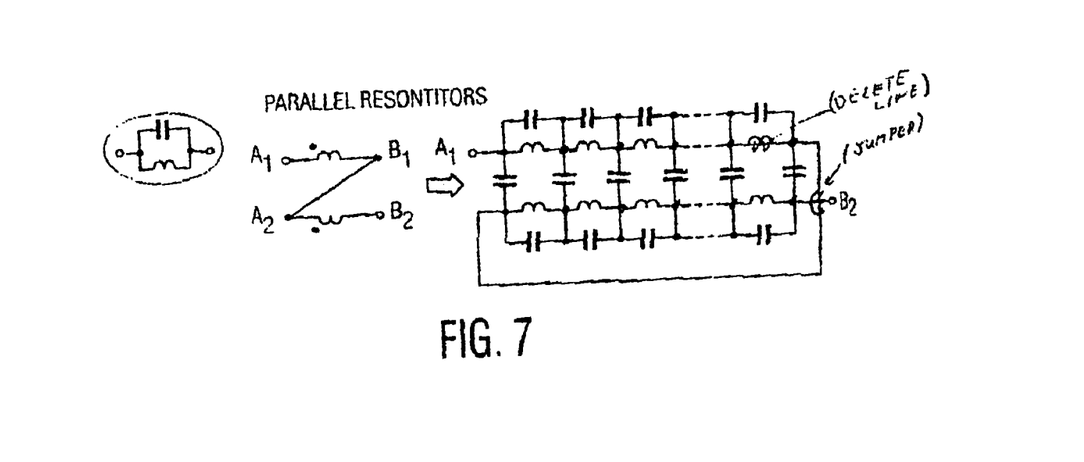

With regard to FIGS. 6 and 7, these drawings illustrate a series resonator and a parallel resonator, respectively. It should be noted in FIG. 6 that possible applications are a low-pass filter and a parallel-loaded resonant half-bridge.

Figure 8A:
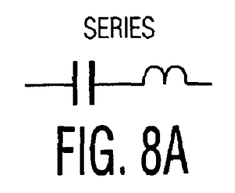
FIGS. 8A and 8B represent a schematic of a series configuration, a graph of impedance versus frequency, respectively. A typical impedance curve is plotted around the first resonant frequency, and L and C denotes that inductive or capacitive behavior are dominant, respectively.
Figure 8B:
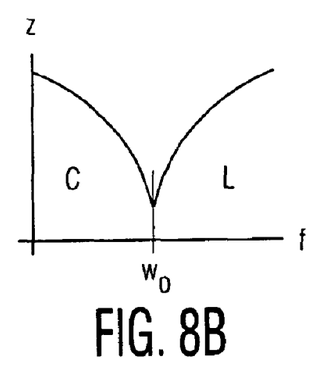

With reference to FIGS. 8A and 8B, a typical impedance curve is plotted around the first resonant frequency, and L and C denotes that inductive or capacitive behavior are dominant, respectively.

The operation of the series planar resonator in this aspect of the present invention is as follows: When the frequency of operation is at a frequencies well below the configuration's self-resonant frequency, then there is larger amount of capacitance present between the each set of spirals, and the series resonator may, from an electric energy perspective, be considered a single-port network that behaves like a capacitor. As shown in FIG. 8B, there is minimal impedance at ω, the resonant frequency. At higher frequencies, the capacitance distributes across the spiral windings and between spiral windings that own inductive characteristics, thus functioning as a two-port network that behaves more like a transmission line. While the simplest equivalent lumped-parameter circuit model comprises an equivalent inductance in series with an equivalent capacitance. A more complex and more accurate model also includes a transformer, and the complexity of such a model may be extended to include high order effects by considering it as a transmission line network.

Figure 8C:
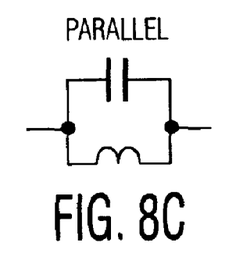
FIGS. 8C and 8D represent a schematic of a parallel configuration, a graph of impedance versus frequency, and a sketch of the capacitance used for energy storage between two spiral coils.
Figure 8D:
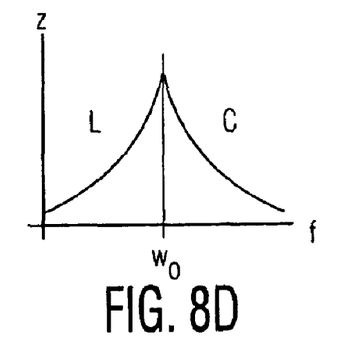

With regard to FIGS. 8C and 8D, a simple equivalent circuit for a parallel resonator is shown. At frequencies of operation well be the resonant frequency, the parallel resonator behaves inductively, which can be as a two-port network. At frequencies of operation above the resonant frequency, the parallel resonator, and the parallel resonator may, from an electric energy perspective, be considered a single-port network that behaves like a capacitor. The impedance is at a maximum at the resonant frequency.

Figure 8E:
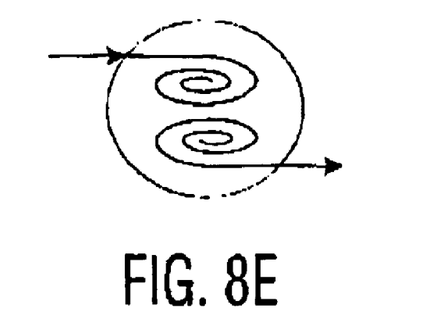
FIGS. 8E through 8G illustrate different arrangements in which energy can enter and exit the configuration by means of electrical coupling.
Figure 8F:
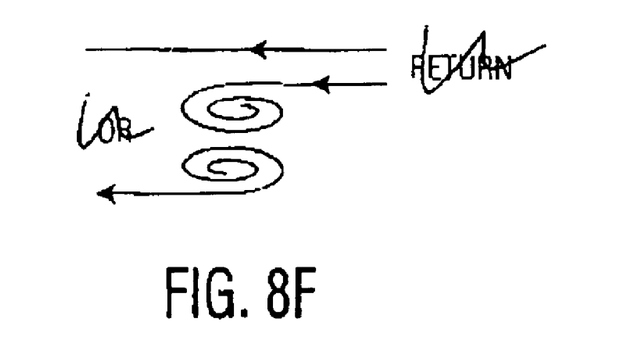
Figure 8G:
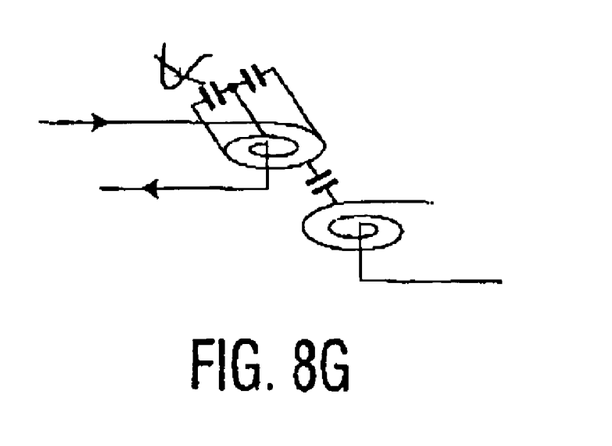

In addition, as shown in FIGS. 8E through 8G, different ways to provide a path for receiving energy and returning energy are provided.

Figure 9A:
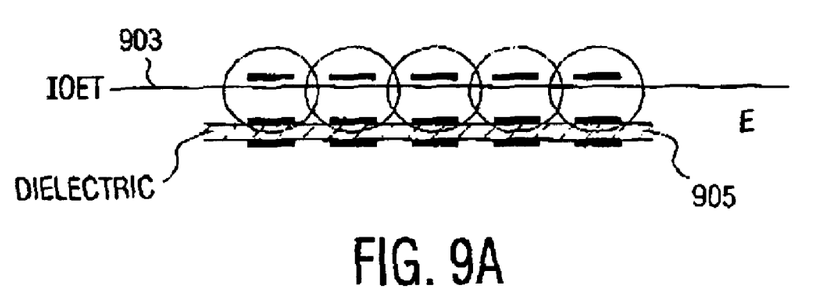
FIGS. 9A to 9C illustrate a cross section of a planar resonator according to the present invention, a top view of two coils, and a reduced order equivalent circuit, respectively.
Figure 9B:
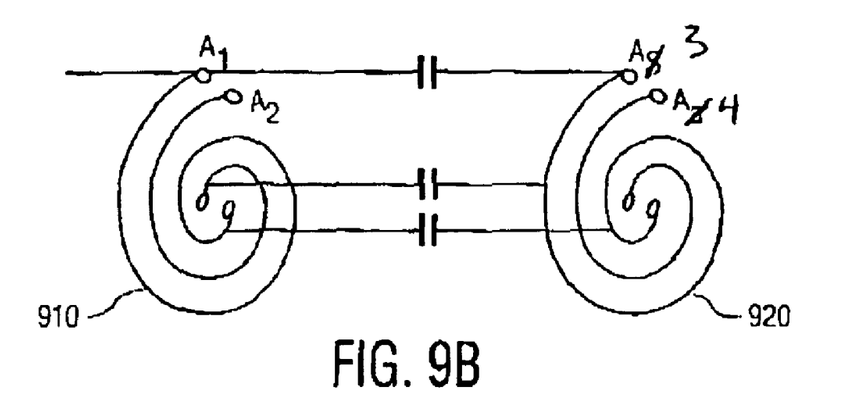
Figure 9C:
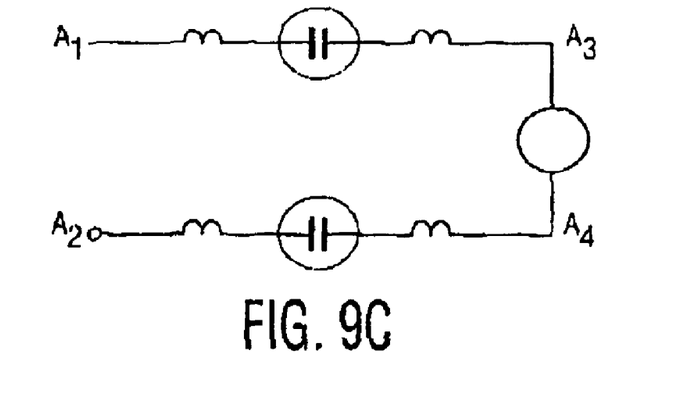

FIG. 9A illustrates that the IOET 903 of the present invention is broader than embodiments of a board separating two coils. As shown in the example in FIGS. 9A and 9b, the IOET is a space between the two spirals, acting as an air coil transformer. As shown in FIG. 9B, there is a capacitance between the coils, which can be utilized for energy transfer, FIG. 9C illustrates an equivalent circuit showing the path from A1 through A4 shown in FIG. 9B. The significance of the IOET being a space between the coils is that, for example, a wireless connection may be made, such as a wireless battery charger. In one particular example, the battery of a device (i.e. a cellphone) could be recharged without using a physical wire to connect the energy source to the coil transfer energy to the battery. Wireless coupling permits this feature, provided that the frequency of the energy transmitted and the coils, are chosen so that there is, for example, a capacitive coupling between the battery and charger.

Figure 10:
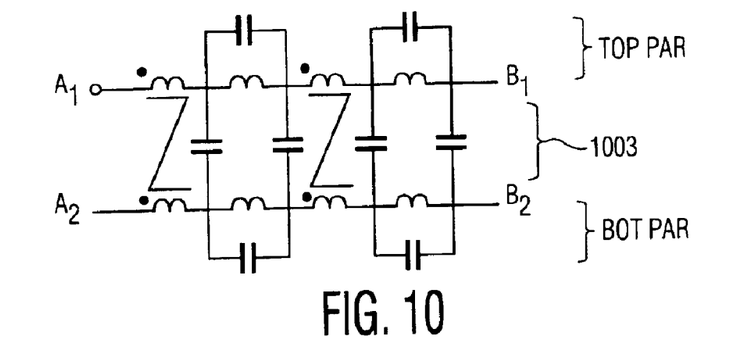
FIG. 10 illustrates equivalent top and bottom parallel resonator circuits, illustrating how the IOET functions across the resonators to transfer electrical power in the forms of electric and magnetic energy combined.

FIG. 10 illustrates an equivalent circuit of top and bottom parallel resonators. It should be understood that the IOET 1003 is not a collection of discrete capacitors, rather is the capacitance across the IOET between the top and bottom resonators. At high enough frequencies, the energy transfer will be in the form of electrical energy across the resonators. Thus capacitive coupling is achieved to permit electrical energy transfer.

Figure 11:
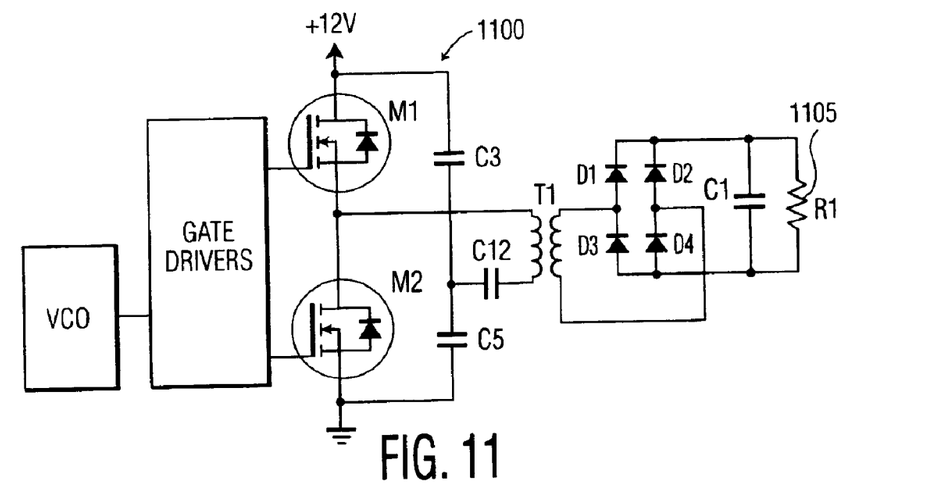
FIG. 11 is a schematic of an equivalent circuit of a series resonant battery charger according to the present invention.

FIG. 11 is a schematic of an equivalent circuit of a series resonant battery charger according to the present invention. This particular battery charger has a level shifter, but it is possible to use a charger without a level shifter.

In this circuit, a different spiral transformer may be used. Each spiral transformer may be modeled as one having its own leakage inductance Ls and magnetizing inductance Lm, thus a proper resonant capacitance (Cr) can be calculated or simulated for a given load specification. In the measurement, the resonant capacitance was manually adjusted for the used spiral transformer. The board can be reconfigured as a flyback topology with active clamp (shown in FIG. 12), when the input DC is supplied from the node between C3 and C5, resonant capacitor C2 and rectification diode D4 are shorted, and D2 and D4 are taken away.

Figure 12:
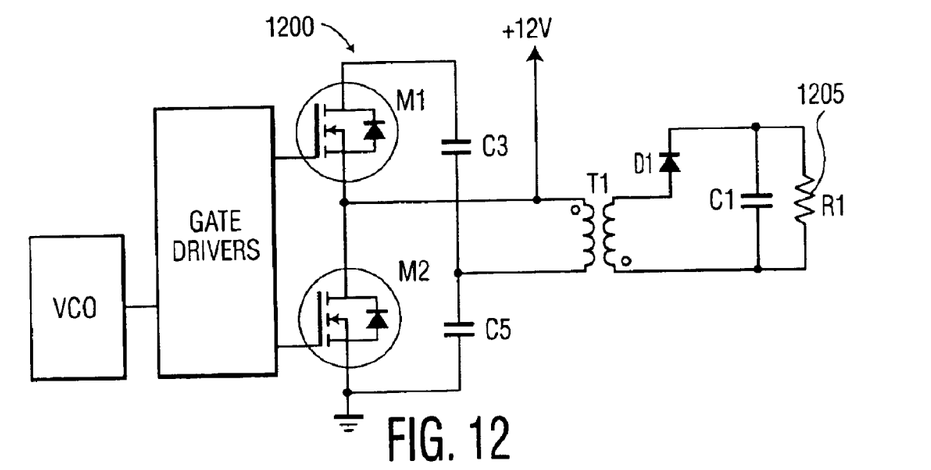
FIG. 12 is a schematic of a flyback transformer according to the instant invention.

FIG. 12 is a schematic of a flyback transformer according to the instant invention. One experiment was done to see if the flyback topology can be used instead of the series resonant topology. There are a number of advantages of using the flyback topology:

One Schottky diode is needed instead of 4 for the series resonant charger in FIG. 10;

Less (significant) loss from rectification diode(s);

Fixed frequency operation with duty cycle control;

No resonant capacitor is needed;

Charger universality may be more easily achieved without resonant capacitor.

In the examples shown in FIGS. 11 and 12, it should be understood that many variations are possible that are still within the spirit of the invention and the scope of the appended claims.

The design parameters of the planar resonator include, but are not limited to, the physical dimensions, including aspect ratios, relative lengths, conductor thickness, material characteristics, such as permittivity (or dielectric constant), permeability, loss tangents of materials including the media comprising the IOET; numbers of turns of spirals.

In addition, the planar resonator can include means for a connection with, or be provided with a connection to a battery charger.

Various modifications may be made to the instant invention that lie within the spirit of the invention and the scope of the appended claims. For example, the number of layers of the resonator, the type of IOET surface, the number and thickness of spirals, illustrating an attachment to, for example, a battery, etc. can all be modified from the structures illustrated in the drawings and described in the specification. The arrangement of the coils may occupy more than one plane, particularly when a resonator arrangement is woven into fabric.

What is claimed is:

1. A planar resonator comprising:

a first coiled conductor arranged on a substrate; and a second coiled conductor having a vertical axis aligned with said first coiled conductor, and electrically insulated from the first coiled conductor;

the first and second coiled conductors being wound in a common direction, without any other conductors between the first and second conductors and having a predetermined self-resonant frequency, wherein:

a capacitance between the first and second conductors permits energy transfer between the first and second coiled conductors, and the arrangement of the coiled conductors comprises a series resonant configuration.

2. The planar resonator of claim 1, wherein:

the first and second coiled conductors include first and second PCB spiral conductors, respectively, and wherein the first and second spiral conductors and the substrate are integrated into a planar structure.

3. The planar resonator of claim 2, wherein a signal applied to the first coiled conductor is transferred to the second coiled conductor by coupling of magnetic flux of the first and second spiral conductors.

4. The planar resonator of claim 3, including a third coiled conductor arranged in a bi-filar spiral configuration with the first coiled conductor on a top surface of the substrate, and wherein the second coiled conductor is arrange on a bottom surface of the substrate.

5. The planar resonator of claim 4, wherein the bi-filar spiral configuration on the top surface and the second coiled conductor on the bottom surface of the substrate forms a series-parallel resonator.

6. The planar resonator of claim 4, wherein the first and third coiled conductors are coupled in series.

7. The planar resonator of claim 2, including a third coiled conductor arranged in a bi-filar spiral configuration with the first coiled conductor on a top surface of the substrate.

8. The planar resonator of claim 7, including a fourth coiled conductor arranged in a bi-filar spiral configuration with the second coiled conductor on a bottom surface of the substrate.

9. The planar resonator of claim 8, wherein the second and fourth coiled conductors are coupled in parallel.

10. The planar resonator of claim 8, wherein the second and fourth coiled conductors are coupled in series.

11. The planar resonator of claim 7, wherein the first and third coiled conductors are coupled in parallel.

12. The planar resonator of claim 1, including a battery charging circuit coupled to one of the first and second coiled conductors.

13. The planar resonator of claim 12, wherein a load is coupled to the other of the first and second coiled conductors.

14. The planar resonator of claim 13, wherein:

the load is magnetically coupled to the other of the first and second coiled conductors, and power is transferred from the battery charging circuit to the load by magnetic flux.

15. The planar resonator of claim 1, including:

a first plurality of coiled conductors, including the first coiled conductor, arranged on a top surface of the substrate in a serial configuration, and a second plurality of coiled conductors, including the second coiled conductor, arranged on a bottom surface of the substrate in a serial configuration.

16. The planar resonator of claim 15, wherein the first plurality and second plurality of coiled conductors are configured as a series-parallel resonator.

17. The planar resonator of claim 1, wherein the substrate includes one of:

a non-conductive dielectric film on a bottom surface of the first coiled conductor, a non-conductive dielectric film on a top surface of the second coiled conductor, and an emulsifier spaced from the bottom surface of the first coiled conductor by an air gap.

18. A planar power resonator comprising a pair of flat coiled conductors having an air gap in between, a first coiled conductor of the pair of coiled conductors being in contact with dielectric, said first coiled conductor including means for coupling to a electric source; and a second coiled conductor of the pair of coiled conductors being vertically aligned with the first coiled conductor, and electrically insulated from the first coiled conductor, the first and second conductors being wound in a common direction, said second coiled conductor including means for coupling with a load, wherein a capacitance between the pair of coiled conductors permits energy transfer from the first coiled conductor to the second coiled conductor to form a series resonant circuit.

19. The planar resonator of claim 18, wherein:

the means for coupling to the electric source is coupled to a battery charger, and the means for coupling with the load is coupled to a battery for wireless battery charging.

20. A planar resonator comprising:

an interface of energy transfer (IOET), said IOET having a top surface and bottom surface;

a first spiral-shaped conductor arranged on the top surface of said IOET;

a second spiral-shaped conductor arranged on the bottom surface of said IOET, said second spiral-shaped conductor having a vertical axis aligned with said first spiral-shaped conductor;

a first substrate material arranged on the top surface of the IOET; and a second substrate material arranged on the bottom surface of the IOET, wherein the second spiral-shaped conductor is electrically insulated from the first spiral-shaped conductor and wound in a common direction as the first spiral-shaped conductor, and the IOET and the first and second spiral-shaped conductors have a predetermined self-resonant frequency.

21. The planar resonator of claim 20, including
a battery charging circuit coupled to one of the first and second spiral-shaped conductors.

22. A method for providing a planar power resonator for contactless power transfer comprising:

(a) providing an interface of energy transfer (IOET), said IOET having a top surface and bottom surface;

(b) arranging a first spiral-shaped conductor on the top surface of said IOET; and (c) arranging a second spiral-shaped conductor on the bottom surface of said IOET so that said second spiral-shaped conductor has a vertical axis in alignment with said first spiral-shaped conductor, and having a winding direction common with the first spiral-shaped conductor, wherein:

the IOET and the first and second spiral-shaped conductors are selected to have a predetermined self-resonant frequency; and the first and second spirals are electrically insulated from each other and arranged in a series resonator arrangement.

23. The method of claim 22, wherein:

arranging the first spiral-shaped conductor includes arranging a first plurality of spiral-shaped conductors in a multi-filar spiral configuration with the first spiral-shaped conductor on the top surface of the IOET, and arranging the second spiral-shaped conductor includes arranging a second plurality of spiral-shaped conductor in a multi-filar spiral configuration with the second spiral-shaped conductor on the bottom surface of the IOET.

24. The method of claim 23, wherein the first plurality second plurality of spiral-shaped conductors are configured as a series-parallel resonator.

25. The method of claim 22, wherein:

arranging the first spiral-shaped conductor includes arranging third spiral-shaped conductor in a bi-filar spiral configuration with the first spiral-shaped conductor on the top surface of the IOET, and arranging the second spiral-shaped conductor includes arranging a fourth spiral-shaped conductor in a bi-filar spiral configuration with the second spiral-shaped conductor on the bottom surface of the IOET.

* * * * *